US008198786B2

(12) United States Patent
Matsuki

(10) Patent No.: US 8,198,786 B2
(45) Date of Patent: Jun. 12, 2012

(54) INERTIAL DRIVING ACTUATOR

(75) Inventor: Kaoru Matsuki, Kawasaki (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/020,711

(22) Filed: Feb. 3, 2011

(65) Prior Publication Data

US 2011/0121766 A1  May 26, 2011

Related U.S. Application Data

(63) Continuation of application No. 11/937,588, filed on Nov. 9, 2007, now Pat. No. 7,902,724.

(30) Foreign Application Priority Data

Nov. 10, 2006 (JP) .................. 2006-305725

(51) Int. Cl.
  *H02N 2/04* (2006.01)
  *H02N 1/00* (2006.01)
(52) U.S. Cl. ...................... 310/328; 310/309
(58) Field of Classification Search .................. 310/309, 310/323.01–323.21, 328
  See application file for complete search history.

(56) References Cited

U.S. PATENT DOCUMENTS

2004/0201443 A1  10/2004  Kaneko

FOREIGN PATENT DOCUMENTS

| JP | 63-94102 A | 4/1988 |
|---|---|---|
| JP | 3-65084 A | 3/1991 |
| JP | 3-160625 A | 7/1991 |
| JP | 3-289368 A | 12/1991 |
| JP | 2000-253683 A | 9/2000 |
| JP | 2003-185406 | 7/2003 |
| JP | 2005-269714 * | 9/2005 |

OTHER PUBLICATIONS

Japanese Office Action dated Jan. 10, 2012 from corresponding Japanese Patent Application No. JP 2006-305725 together with an English language translation.

* cited by examiner

*Primary Examiner* — Derek Rosenau
(74) *Attorney, Agent, or Firm* — Scully, Scott, Murphy & Presser, P.C.

(57) ABSTRACT

An inertial driving actuator includes a fixing member, a moving element that is fixed to the fixing member and generates a small displacement by extension and contraction, an oscillation substrate that is fixed to the moving element and is moved linearly reciprocally by the small displacement, and a moving body that is moved by reciprocal movement of the oscillation substrate. The moving body has a first electrode. The oscillation substrate has a second electrode, the area of the facing portion of the second electrode and the first electrode changing continuously as the moving body moves. The actuator further includes a frictional force controller that controls a frictional force generated between the oscillation substrate and moving body, and a position detector that detects the position of the moving body on the basis of the electrostatic capacitance of the facing portion of the first electrode and the second electrode.

11 Claims, 10 Drawing Sheets

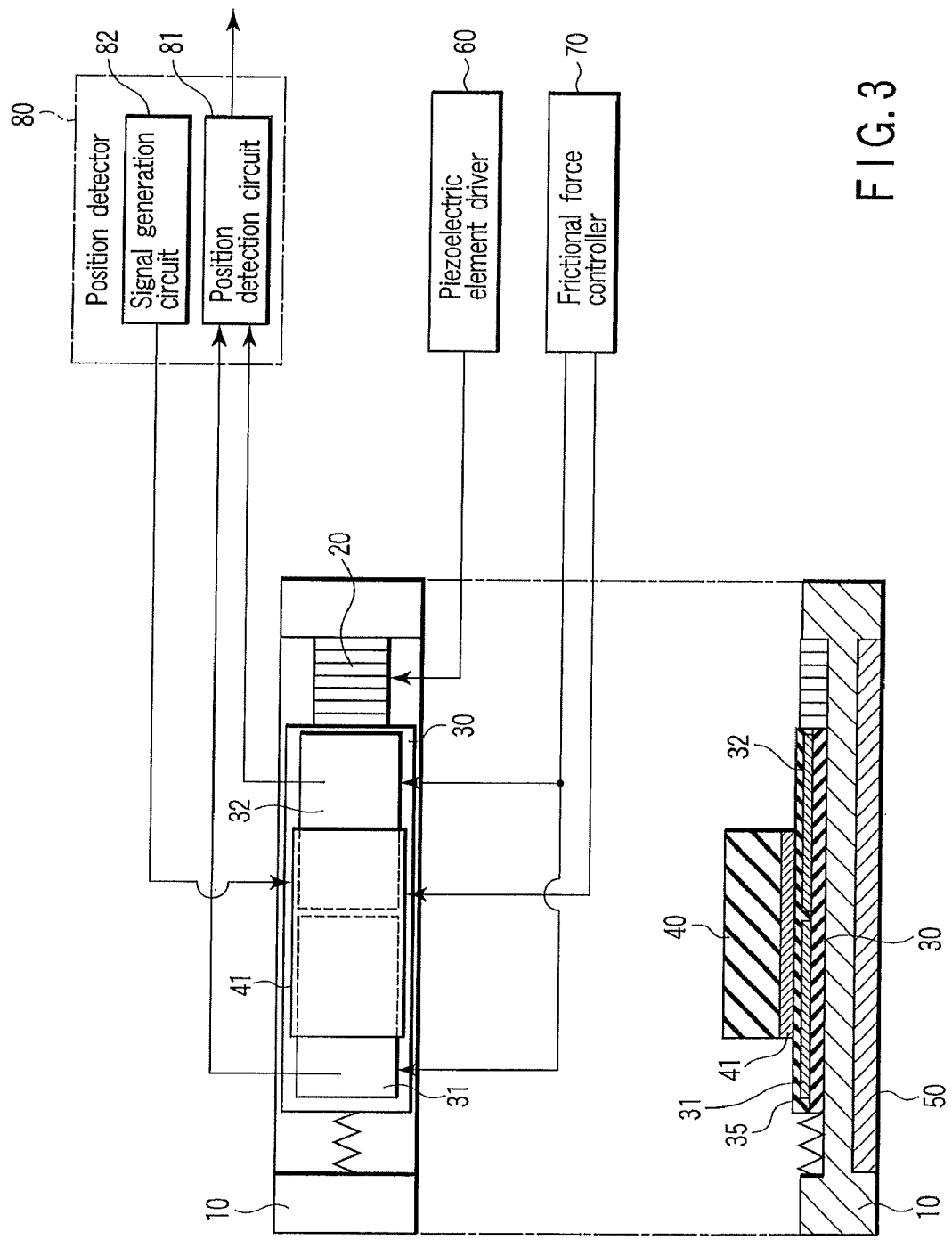
F I G. 3

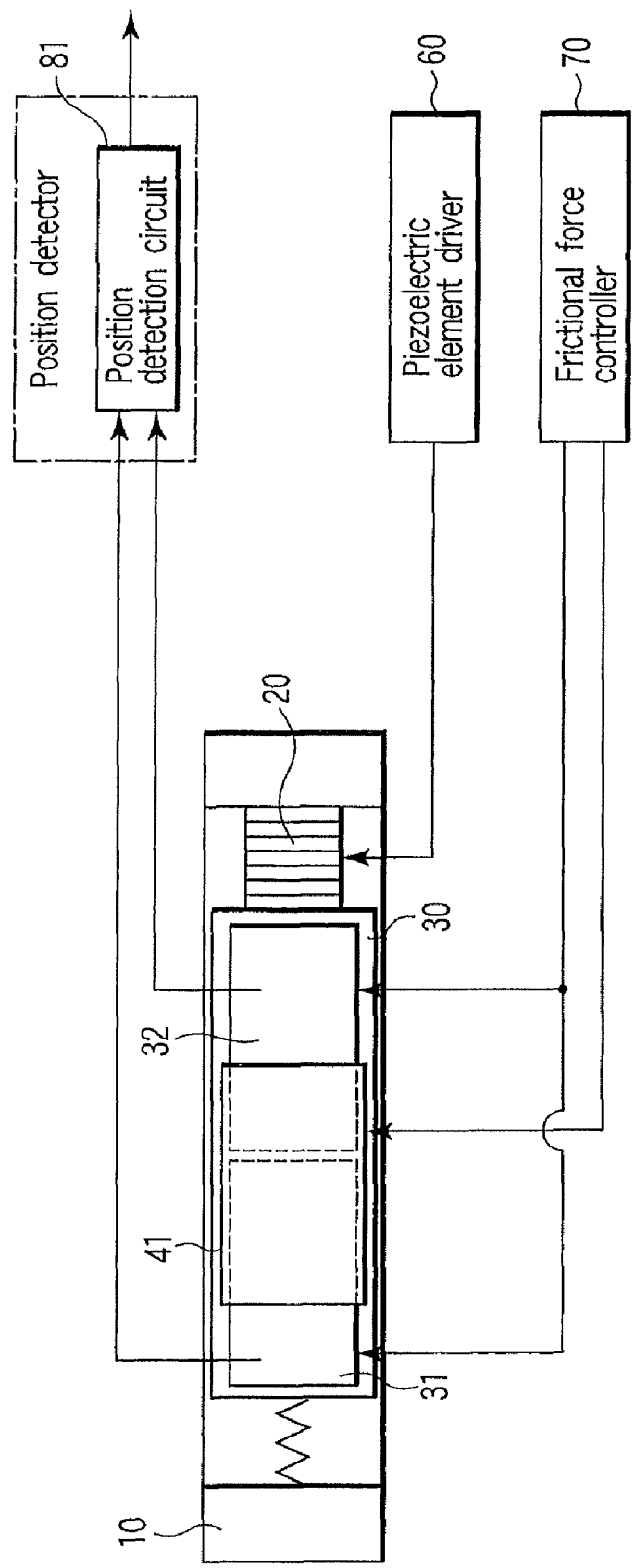
F I G. 6

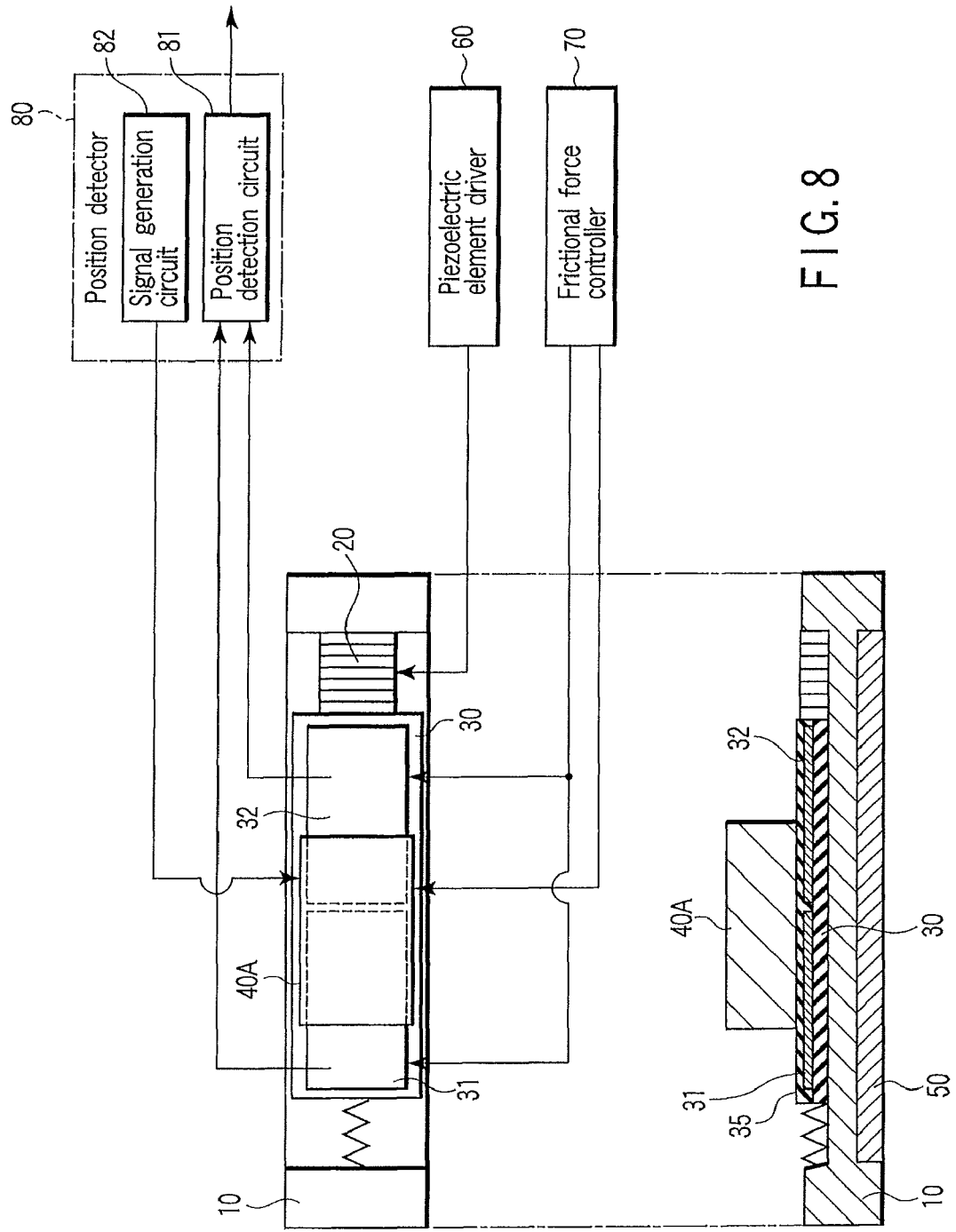
F I G. 8

INERTIAL DRIVING ACTUATOR

CROSS-REFERENCE TO RELATED APPLICATIONS

This application is a continuation application of U.S. application Ser. No. 11/937,588 filed on Nov. 9, 2007, which is based upon and claims the benefit of priority from prior Japanese Patent Application No. 2006-305725 filed Nov. 10, 2006, the entire contents of each of which are incorporated herein by reference.

BACKGROUND OF THE INVENTION

1. Field of the Invention

The present invention relates to an inertial driving actuator.

2. Description of the Related Art

Assume that a driving pulse with a waveform having a moderate rise and a subsequent sharp decay is applied to a piezoelectric element as a kind of electromechanical converting element. The piezoelectric element moderately extends at the moderate rise of the driving pulse, and quickly contracts at its sharp decay. An inertial driving actuator that utilizes these characteristics is known. In the inertial driving actuator, a driving pulse having the above waveform is applied to a piezoelectric element to generate oscillations having different speeds in the extending and contracting directions. This reciprocally moves a driving member fixed to the piezoelectric element at different speeds. Thus, a moving member frictionally coupled to the driving member moves in a predetermined direction.

Jpn. Pat. Appln. KOKAI Publication No. 2003-185406 discloses an inertial driving actuator with a position detection function for a moving member. FIG. 10 shows this inertial driving actuator. In this inertial driving actuator 100, one end of a piezoelectric element 120 is fixed to a frame 110 of the actuator by means such as adhesion. A driving shaft 130 is fixed to the other end of the piezoelectric element 120 by means such as adhesion. A moving member 140 is frictionally coupled to the driving shaft 130. A detection member 150 constitutes a fixed electrode to detect the position of the moving member 140 on the basis of an electrostatic capacitance. The detection member 150 extends in parallel to the moving direction of the moving member 140 to be in non-contact with the moving member 140, and is fixed to the frame 110. The driving shaft 130, moving member 140, and detection member 150 are made of a conductive material. The detection member 150 has, on its surface that faces the moving member 140, uneven portions at a predetermined interval in the moving direction of the moving member 140, thus forming an electrode 151. The electrode 151 and moving member 140 face each other at a gap D to form a capacitor.

When assembling the above inertial driving actuator 100, the driving shaft 130 and detection member 150 must be maintained at a gap and a parallel degree respectively falling within allowable ranges. This is because in position detection utilizing an electrostatic capacitance, a change in gap between electrodes that form a capacitor may decrease the detection accuracy.

BRIEF SUMMARY OF THE INVENTION

An inertial driving actuator according to the present invention includes a fixing member, a moving element that is fixed to the fixing member and generates a small displacement by extension and contraction, an oscillation substrate that is fixed to the moving element and is moved linearly reciprocally by the small displacement, a moving body arranged on the oscillation substrate, a first electrode formed on a surface of the moving body that faces the oscillation substrate, a second electrode formed on a surface of the oscillation substrate that faces the moving body, and an insulating film present between the first electrode and the second electrode. The moving body is moved by inertia with respect to the oscillation substrate upon reciprocal movement of the oscillation substrate. As the moving body moves, the area of a facing portion of the first electrode and the second electrode changes continuously. The inertial driving actuator further includes a frictional force controller that applies a voltage between the first electrode and the second electrode to exert an electrostatic force between them to control a frictional force generated between the oscillation substrate and the moving body, and a position detector that detects a position of the moving body with respect to the oscillation substrate on the basis of the electrostatic capacitance of the facing portion of the first electrode and the second electrode.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 shows the arrangement of an inertial driving actuator according to the second embodiment of the present invention;

FIG. 6 shows the arrangement of an inertial driving actuator according to the first modification of the second embodiment;

FIG. 8 shows the arrangement of an inertial driving actuator according to the third modification of the second embodiment;

DETAILED DESCRIPTION OF THE INVENTION

The embodiments of the present invention will be described with reference to the accompanying drawing.

First Embodiment

Figure 1:
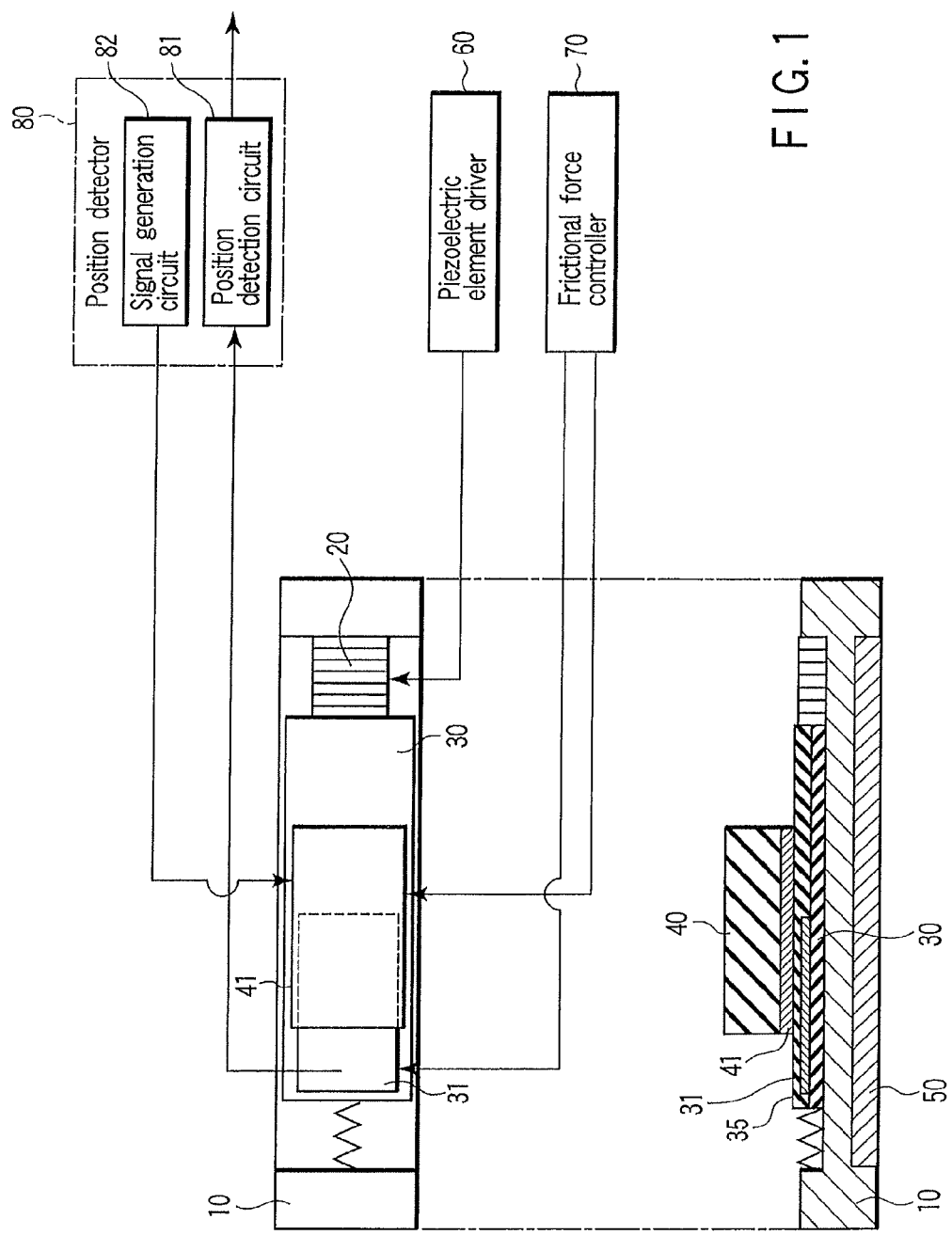
FIG. 1 shows the arrangement of an inertial driving actuator according to the first embodiment of the present invention.

FIG. 1 shows the arrangement of an inertial driving actuator according to the first embodiment of the present invention.

As shown in FIG. 1, the inertial driving actuator comprises a fixing member 10, a piezoelectric element 20 that generates a small displacement by extension and contraction, an oscillation substrate 30 that is moved nearly reciprocally by the small displacement, a moving body 40 arranged on the oscillation substrate 30, and a piezoelectric element driver 60 that drives to extend and contract the piezoelectric element 20.

One end of the piezoelectric element 20 is fixed to the fixing member 10, and the other end is fixed to one end of the oscillation substrate 30. A spring is arranged between the other end of the oscillation substrate 30 and the fixing member 10. As the piezoelectric element 20 extends or contracts, the oscillation substrate 30 reciprocally moves in the extending/contracting direction with respect to the fixing member 10.

The moving body 40 has a first electrode 41 on its surface that faces the oscillation substrate 30. The oscillation substrate 30 has a second electrode 31 on its surface that faces the moving body 40. The oscillation substrate 30 also has an insulating film 35 that covers the second electrode 31. The insulating film 35 is present between the first electrode 41 and the second electrode 31. The second electrode 31 has a rectangular shape, and extends from the left end to the center of the oscillation substrate 30 along the straight line parallel to the moving direction of the moving body 40 with respect to the oscillation substrate 30. The first electrode 41 and second electrode 31 always face partially each other through the insulating film 35. As the moving body 40 moves with respect to the oscillation substrate 30, the area of the facing portion of the first electrode 41 and second electrode 31 changes continuously. Namely, the area of the facing portion increases or decreases depending on the moving direction of the moving body 40. As the moving body 40 moves, the facing portion of the first electrode 41 and second electrode 31 changes in a dimension along the straight line parallel to the moving direction of the moving body 40.

A permanent magnet 50 is arranged on the lower surface of the fixing member 10, i.e., on a side opposite to the side where the oscillation substrate 30 is arranged. The permanent magnet 50 extends along a straight line parallel to the reciprocal direction of the oscillation substrate 30. The moving body 40 is made of a magnetic material. Hence, a magnetic attracting force acts between the moving body 40 and permanent magnet 50 to hold the moving body 40 stably. A guide (not shown) supports the moving body 40 not to deviate from the moving direction and not to separate from the oscillation substrate 30.

The inertial driving actuator also comprises a frictional force controller 70 that applies a voltage between the first electrode 41 and second electrode 31 to exert an electrostatic force between them so as to control a frictional force generated between the oscillation substrate 30 and moving body 40, and a position detector 80 that detects the position of the moving body 40 with respect to the oscillation substrate 30 on the basis of the electrostatic capacitance of a capacitor formed by the facing portion of the first electrode 41 and second electrode 31. The position detector 80 comprises a position detection circuit 81 and a signal generation circuit 82. The position detection circuit 81 outputs a signal reflecting the electrostatic capacitance of the facing portion of the first electrode 41 and second electrode 31. The signal generation circuit 82 applies a voltage such as a sine-waveform voltage to the first electrode 41 for position detection of the moving body 40.

Figure 2:
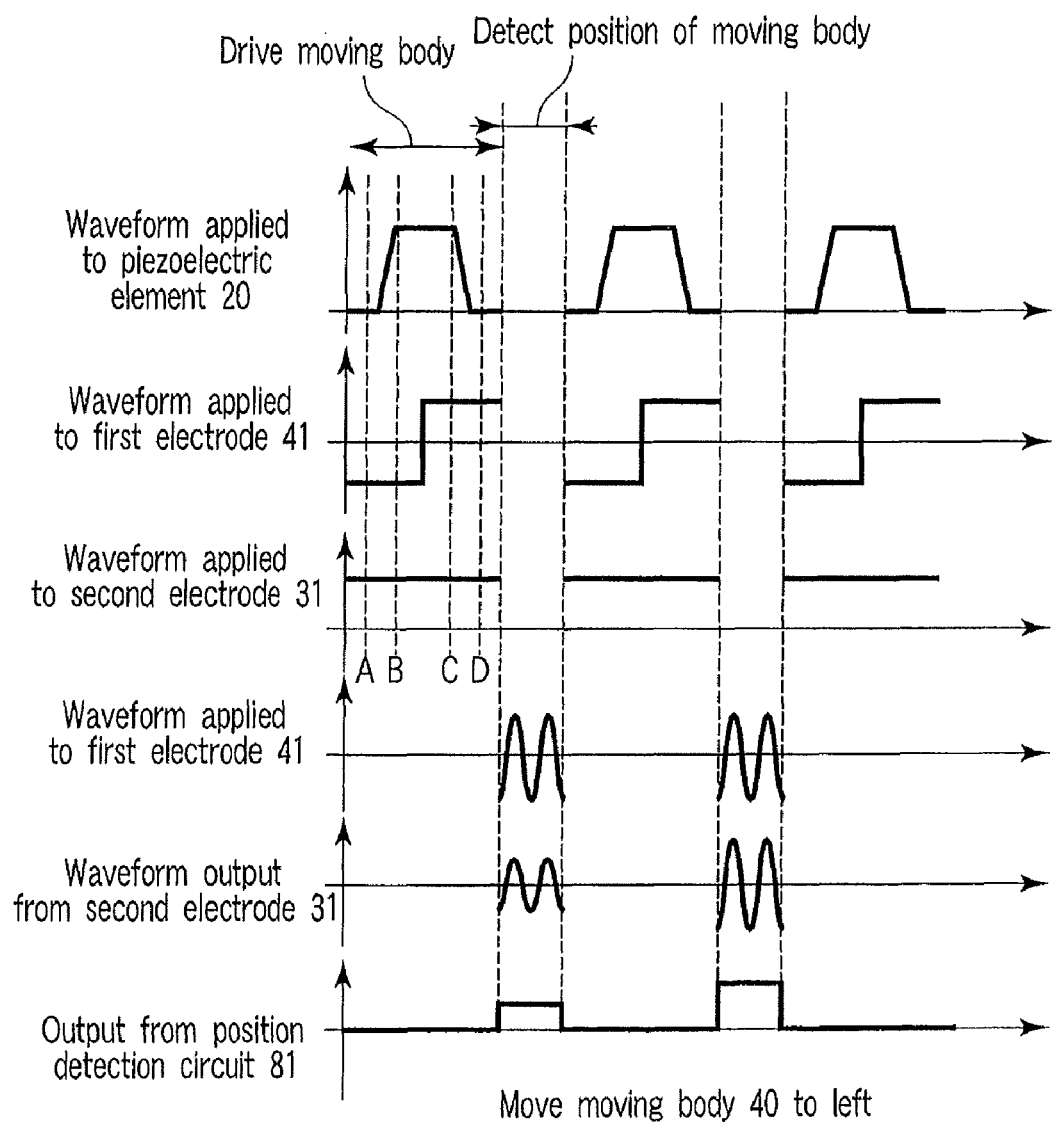
FIG. 2 is a timing chart of driving and position detection in the inertial driving actuator in FIG. 1.

Driving and position detection in the inertial driving actuator of this embodiment will be explained with reference to FIG. 2. FIG. 2 is a timing chart in the operation of moving the moving body 40 to the left. The position of the moving body 40 is detected after moving the moving body 40. Namely, the step of moving the moving body 40 and the step of detecting the position of the moving body 40 are performed separately.

In the step of moving the moving body 40, the piezoelectric element driver 60 applies a trapezoidal-waveform voltage to the piezoelectric element 20. The frictional force controller 70 applies a rectangular-waveform voltage to the first electrode 41 and a constant voltage to the second electrode 31. Upon application of the trapezoidal-waveform voltage, the piezoelectric element 20 extends at the rise of the trapezoidal waveform and contracts at its decay. When the piezoelectric element 20 extends and contracts, the oscillation substrate 30 reciprocally moves on the fixing member 10. The rectangular-waveform voltage applied to the first electrode 41 has a period corresponding to the trapezoidal-waveform voltage applied to the piezoelectric element 20, and takes a negative polarity at the rise of the trapezoidal waveform and a positive polarity at its decay. The voltage applied to the second electrode 31 has a positive polarity. In one step of moving the moving body 40, a 1-pulse trapezoidal-waveform voltage is applied to the piezoelectric element 20, and a 1-pulse rectangular-waveform voltage is applied to the first electrode 41. The voltage applied to the piezoelectric element 20 is not limited to a trapezoidal-waveform voltage, but may be a triangular- or rectangular-waveform voltage.

In the section from A to B, the waveform applied to the piezoelectric element 20 rises sharply. Thus, the piezoelectric element 20 extends quickly, and accordingly the oscillation substrate 30 quickly moves to the left. At this time, the voltage applied to the first electrode 41 and that applied to the second electrode 31 have opposite polarities. Hence, an electrostatic chucking force acts between the oscillation substrate 30 and moving body 40, so that the frictional force generated between them is comparatively large. Consequently, as the oscillation substrate 30 is displaced, the moving body 40 also moves to the left.

In the section from C to D, the waveform applied to the piezoelectric element 20 falls sharply. Thus, the piezoelectric element 20 contracts quickly, and accordingly the oscillation substrate 30 quickly moves to the right. At this time, the voltage applied to the first electrode 41 and that applied to the second electrode 31 have the same polarity. Hence, no electrostatic chucking force acts between the oscillation substrate 30 and moving body 40, so that the frictional force generated between them is comparatively small. Consequently, the inertia of the moving body 40 excels the frictional force between the oscillation substrate 30 and moving body 40, and the moving body 40 stays in position.

As the result of these series of operations, the moving body 40 moves to the left with respect to the oscillation substrate 30. The moving distance at this time serves as the unit of movement of the moving body 40. The step of moving the moving body 40 is thus ended.

In this embodiment, the operation of moving the moving body 40 to the left has been described. To move the moving body 40 to the right, the polarity of the waveform applied to the first electrode 41 may be reversed in the series of operations described above.

In the step of detecting the position of the moving body 40, voltage application of the piezoelectric element driver 60 to the piezoelectric element 20 and that of the frictional force controller 70 to the first electrode 41 and second electrode 31 are stopped. The signal generation circuit 82 applies a voltage, e.g., a sine-waveform voltage, to the first electrode 41.

Position detection of the moving body 40 is performed by detecting the electrostatic capacitance of the facing portion of the first electrode 41 and second electrode 31. The electrostatic capacitance of the facing portion of the first electrode 41 and second electrode 31 is proportional to the area of the facing portion, and the area changes continuously depending on the position of the moving body 40. Thus, the position of the moving body 40 is obtained by detecting the electrostatic capacitance of the facing portion of the first electrode 41 and second electrode 31.

The position detection circuit 81 generates a signal reflecting the electrostatic capacitance of the facing portion of the first electrode 41 and second electrode 31 from a waveform that is output from the second electrode 31 upon application of the driving signal to the first electrode 41. The electrostatic capacitance is obtained from the peak value of the waveform output from the second electrode 31. Namely, the position detection circuit 81 outputs the peak value of the waveform output from the second electrode 31. Consequently, the position of the moving body 40 is detected. The step of detecting the position of the moving body 40 is thus ended and, where necessary, the sequence returns to the step of moving the moving body 40.

In position detection utilizing electrostatic capacitance, a change in gap between electrodes that form a capacitor decreases detection accuracy. In the inertial driving actuator of this embodiment, however, the moving body 40 is arranged in contact with the oscillation substrate 30, and the first electrode 41 faces the second electrode 31 through the insulating film 35. The thickness of the insulating film 35 determines the gap between the first electrode 41 and second electrode 31. The insulating film 35 preferably has a uniform thickness of several μm to sub μm. Such an insulating film 35 can be easily formed by a semiconductor process. Hence, the first electrode 41 and second electrode 31 are stably maintained at a narrow gap of several μm to sub μm. Thus, the electrostatic capacitance of the facing portion of the first electrode 41 and second electrode 31 is detected with a high resolution, and the position of the moving body 40 is detected with a high accuracy. Namely, the inertial driving actuator of this embodiment is easy to assemble and high in position detection accuracy.

In the inertial driving actuator of this embodiment, the piezoelectric element 20 is extended and contracted at the same speed. As the speed of displacement of the piezoelectric element 20 does not change between extending displacement and contracting displacement, the driving waveform is simple.

According to this embodiment, the step of moving the moving body 40 and the step of detecting the position of the moving body 40 are performed separately at different times. This ensures driving and position detection. As the rectangular-waveform voltage is applied to the first electrode 41, when the piezoelectric element 20 extends, a stable electrostatic chucking force acts between the oscillation substrate 30 and moving body 40. This decreases variations in moving amount of the moving body 40, and the moving body 40 is moved with a stable unit of predetermined distance.

In the above description, the step of moving the moving body 40 and the step of detecting the position of the moving body 40 alternate. However, the present invention is not limited to this. The step of moving the moving body 40 may be repeated a number of times, and after that the step of detecting the position of the moving body 40 may be performed.

Second Embodiment

Figure 4:
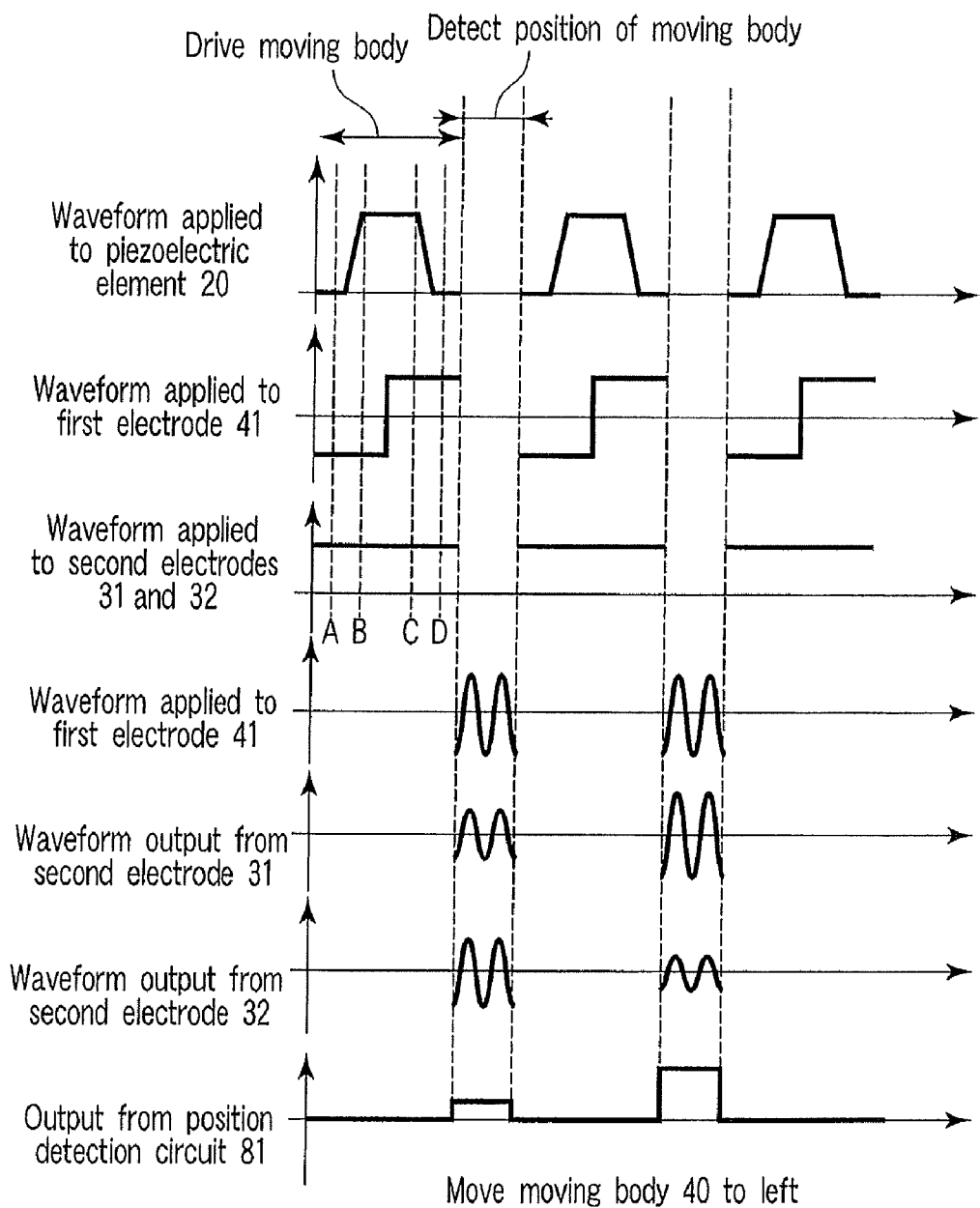
FIG. 4 is a timing chart of driving and detection in the inertial driving actuator in FIG. 3.

FIG. 3 shows the arrangement of an inertial driving actuator according to the second embodiment of the present invention. In FIG. 3, the members denoted by the same reference numerals as in FIG. 1 are similar members. FIG. 4 is a timing chart of driving and detection in the inertial driving actuator of this embodiment.

According to this embodiment, an oscillation substrate 30 has another second electrode 32 in addition to a second electrode 31. The second electrode 32 has the same shape as that of the second electrode 31 and is located on the same plane as the second electrode 31. The second electrodes 31 and 32 are arranged adjacent to each other along a straight line parallel to the moving direction of a moving body 40. The second electrode 31 extends from the left end to the center of the oscillation substrate 30 and the second electrode 32 extends from the right end to the center of the oscillation substrate 30, along the straight line parallel to the moving direction of the moving body 40. A first electrode 41 always partially faces both the second electrodes 31 and 32 through an insulating film 35. As the moving body 40 moves, the area of the facing portion of the first electrode 41 and second electrode 31 and that of the facing portion of the first electrode 41 and second electrode 32 change continuously. Furthermore, of the areas of the two facing portions, one decreases and the other increases depending on the moving direction of the moving body 40. More specifically, with respect to the leftward movement of the moving body 40, the area of the facing portion of the first electrode 41 and second electrode 31 increases, and that of the facing portion of the first electrode 41 and second electrode 32 decreases on the contrary. As the moving body 40 moves, the facing portion of the first electrode 41 and second electrode 31 and that of the first electrode 41 and second electrode 32 change in dimension along the straight line parallel to the moving direction of the moving body 40.

A position detection circuit 81 outputs a signal reflecting the difference between the electrostatic capacitance of the facing portion of the first electrode 41 and second electrode 31 and that of the facing portion of the first electrode 41 and second electrode 32.

The driving scheme of the inertial driving actuator according to this embodiment is substantially the same as that of the first embodiment. Note that in this embodiment, the same voltage as that applied to the second electrode 31 is applied to the second voltage 32.

As shown in FIG. 4, as the moving body 40 moves to the left, the electrostatic capacitance of the facing portion of the first electrode 41 and second electrode 31 increases gradually, and accordingly the output from the second electrode 31 also increases gradually. On the contrary, the electrostatic capacitance of the facing portion of the first electrode 41 and second electrode 32 decreases gradually, and accordingly the output from the second electrode 32 also decreases gradually.

The position detection circuit 81 outputs a difference between the peak value of the output from the second electrode 31 and that of the output from the second electrode 32. This difference in peak value corresponds to the difference between the electrostatic capacitance of the facing portion of the first electrode 41 and second electrode 31 and that of the facing portion of the first electrode 41 and second electrode 32, and reflects the position of the moving body 40.

Figure 5:
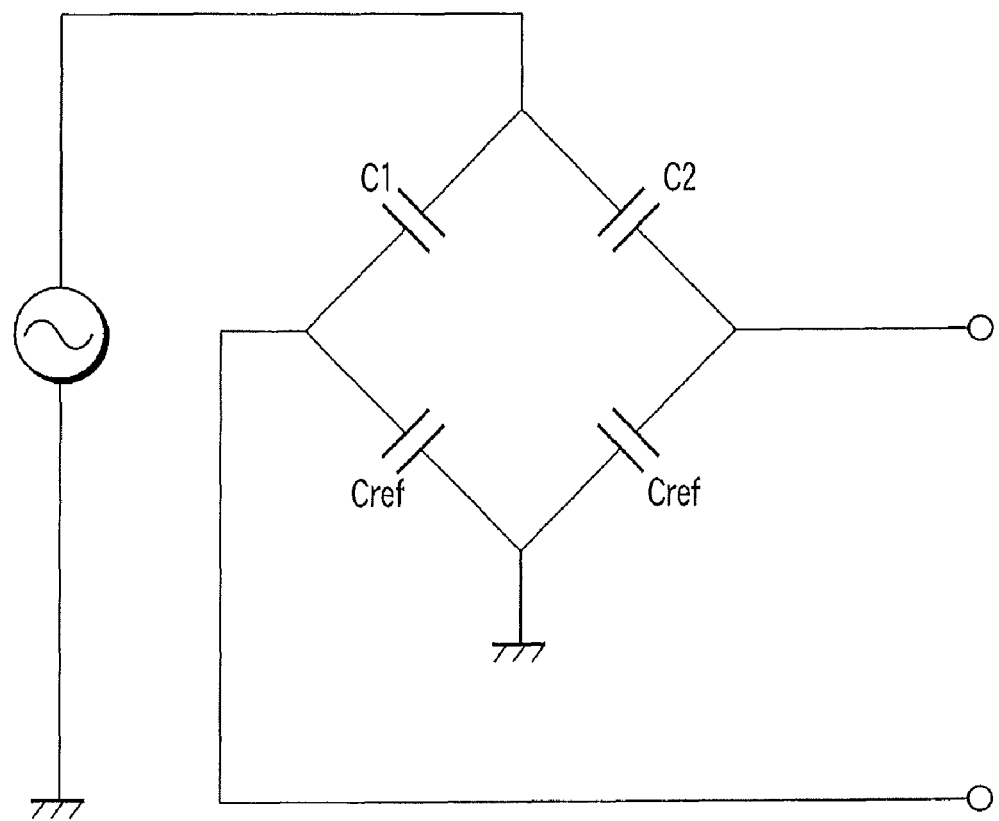
FIG. 5 shows a circuit that detects the electrostatic capacitance in a position detection circuit.

A circuit that detects the electrostatic capacitance may comprise, e.g., a capacitor bridge, as shown in FIG. 5, in which two reference capacitors Cref are arranged in addition to a capacitor C1 formed by the facing portion of the first electrode 41 and second electrode 31 and a capacitor C2 formed by the facing portion of the first electrode 41 and second electrode 32. The output signals from the second electrodes 31 and 32 in response to application of the capacitance-detection voltage signal to the first electrode 41 correspond to the electrostatic capacitances of the capacitors C1 and C2, respectively. In place of using the capacitor bridge, a switched capacitor circuit, or a method of superposing an RF frequency on the waveform applied to the first electrode 41, which is used in driving, may be employed.

According to this embodiment, the oscillation substrate 30 has two second electrodes, i.e., the second electrode 31 and second electrode 32. As the moving body 40 moves, of the electrostatic capacitance of the facing portion of the first electrode 41 and second electrode 31 and that of the facing portion of the first electrode 41 and second electrode 32, one increases and the other decreases. The change amounts of the two electrostatic capacitances are equal. Thus, the sensitivity of the inertial driving actuator of this embodiment is twice that of an inertial driving actuator in which the oscillation substrate 30 has only one second electrode. From an opposite point of view, this means that the inertial driving actuator of this embodiment has a two-fold resolution. Thus, the position of the moving body 40 is detected with a higher accuracy.

In the inertial driving actuator of this embodiment, if the resolution of position detection is suppressed to almost the same degree as that of the actuator in which the oscillation substrate 30 has only one second electrode, the width (a dimension along a straight line perpendicular to the moving direction of the moving body 40) of each of the second electrodes 31 and 32 can be halved. This can decrease the diameter of (can downsize) the inertial driving actuator.

[First Modification]

FIG. 6 shows the arrangement of an inertial driving actuator according to the first modification of the second embodiment. In FIG. 6, the members denoted by the same reference numerals as in FIG. 3 are similar members. This modification employs no signal generation circuit 82, and a frictional force controller 70 also serves as the signal generation circuit 82. Namely, in the step of detecting the position of the moving body 40, the frictional force controller 70 generates a signal for position detection and applies it to the first electrode 41. According to this modification, the signal generation circuit 82 is unnecessary, achieving a simple arrangement. In this modification, it can be said that the frictional force controller 70 also serves as part of a position detector.

[Second Modification]

In FIG. 4, the voltages applied to the second electrodes 31 and 32 are constant voltages, and their polarities do not change. This leads to a possibility of undesirable charging of the insulating film 35 formed on the second electrodes 31 and 32. Charging of the insulating film 35 decreases the electrostatic chucking force acting between the oscillation substrate 30 and moving body 40. Then, a frictional force sufficient to move the moving body 40 together with the oscillation substrate 30 may not be generated between the oscillation substrate 30 and moving body 40.

Figure 7:
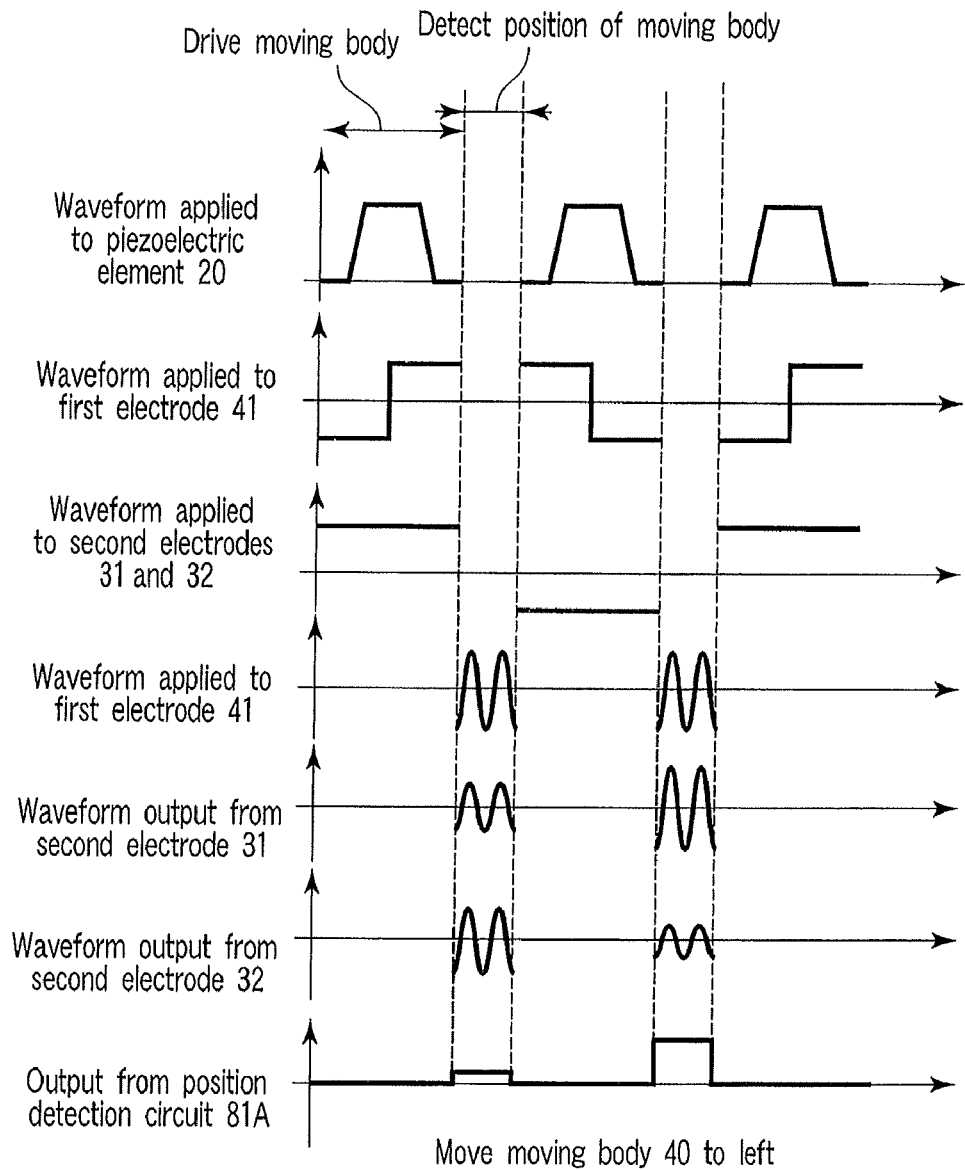
FIG. 7 is a timing chart of driving and position detection in an inertial driving actuator according to the second modification of the second embodiment.

FIG. 7 is a timing chart of driving and detection in an inertial driving actuator according to the second modification of the second embodiment. In this modification, as shown in FIG. 7, in each step of moving the moving body 40, the frictional force controller 70 reverses the polarity of the voltage applied to each of the second electrode 31 and 32, and the polarity of a rectangular-waveform voltage applied to the first electrode 41. This voltage application prevents charging of the insulating film 35. Consequently, driving of the inertial driving actuator becomes more stable. Namely, the moving body 40 is moved with the stabler unit of predetermined distance.

[Third Modification]

FIG. 8 shows the arrangement of an inertial driving actuator according to the third modification of the second embodiment. In FIG. 8, the members denoted by the same reference numerals as in FIG. 3 are similar members. In this modification, as shown in FIG. 8, a moving body 40A is made of a conductive magnetic material. The moving body 40A itself serves as the first electrode 41 identical to that described so far.

In this modification, the moving body 40A has a simple arrangement and can be downsized easily.

[Fourth Modification]

Figure 9:
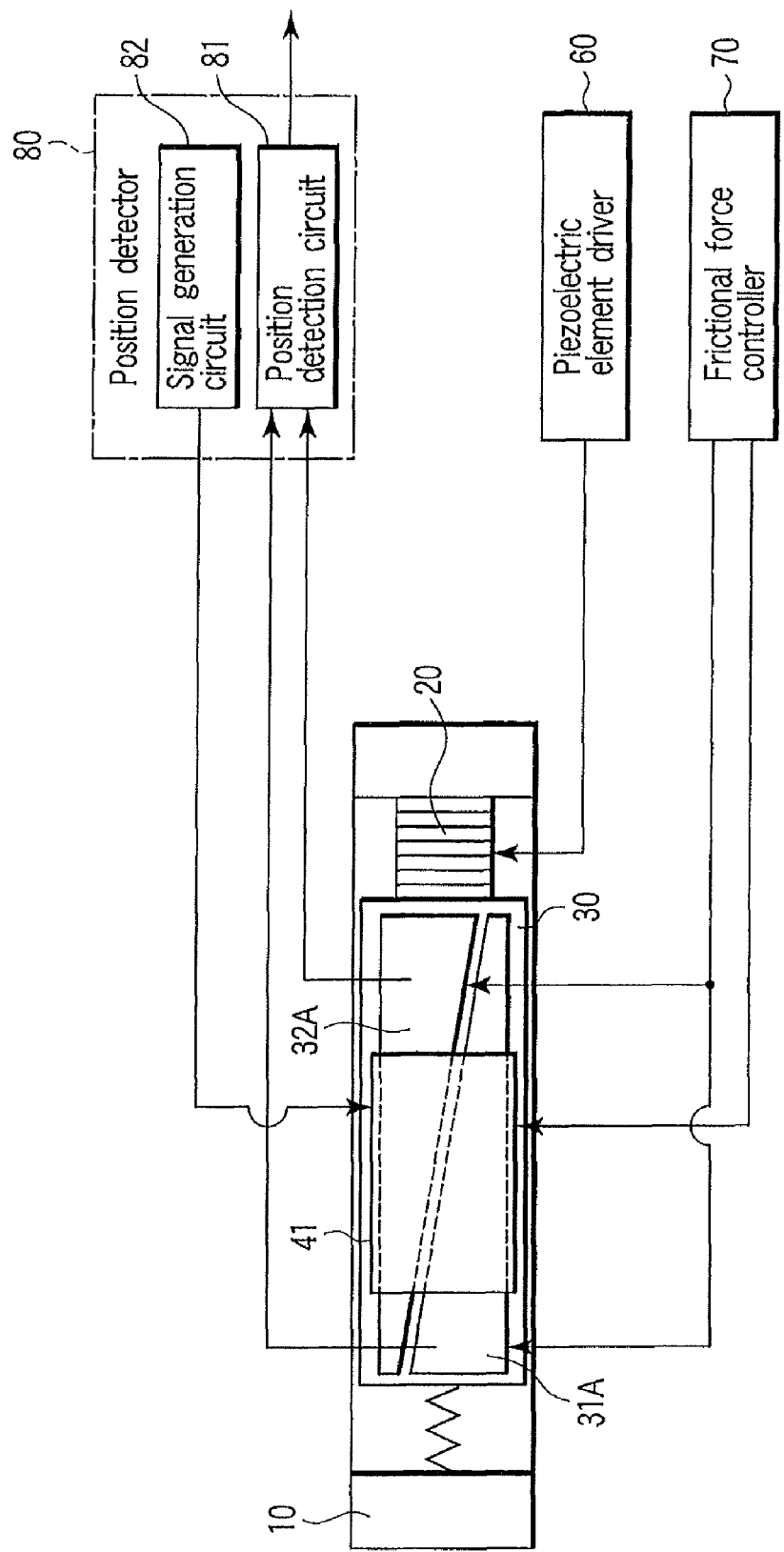
FIG. 9 shows the arrangement of an inertial driving actuator according to the fourth modification of the second embodiment.
Figure 10:
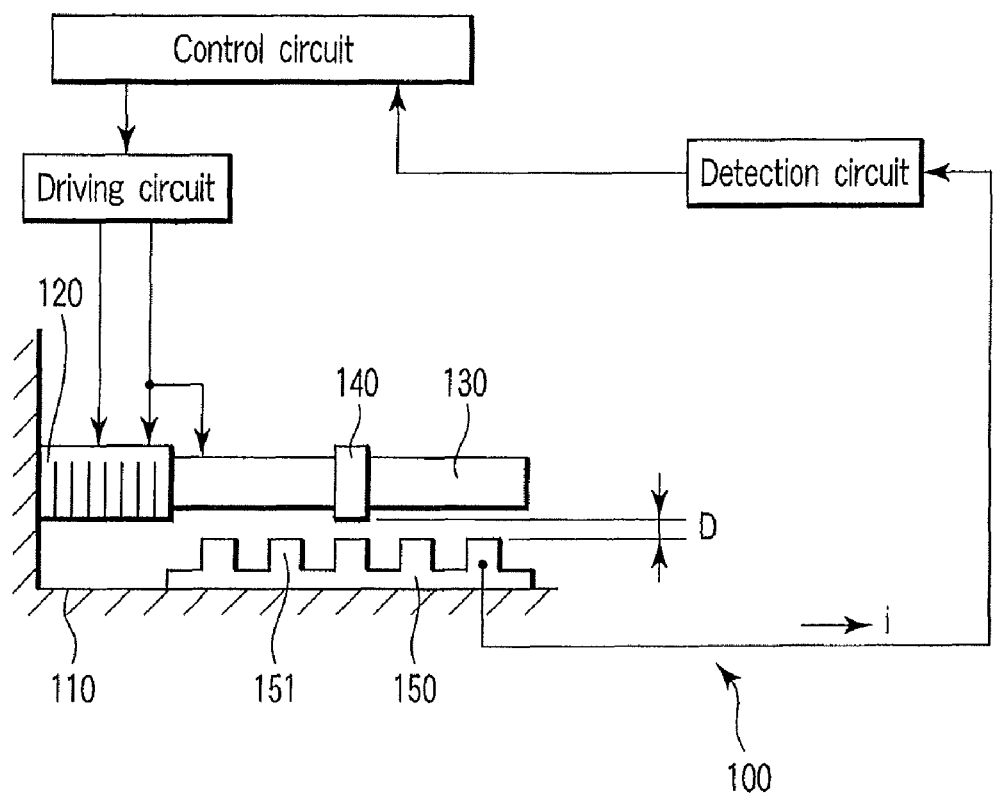
FIG. 10 shows the arrangement of an inertial driving actuator having a conventional position detecting function.

FIG. 9 shows the arrangement of an inertial driving actuator according to the fourth modification of the second embodiment. In FIG. 9, the members denoted by the same reference numerals as in FIG. 3 are similar members. In this modification, as shown in FIG. 9, the oscillation substrate 30 has second electrodes 31A and 32A. As a whole, the second electrodes 31A and 32A extend along a straight line parallel to the moving direction of the oscillation substrate 30. The second electrodes 31A and 32A are located adjacent to each other at a gap, and this gap extends obliquely with respect to the moving direction of the oscillation substrate 30. The dimension of the second electrode 31A decreases continuously along the straight line perpendicular to the moving direction of the moving body 40 from the left to the right of the oscillation substrate 30. On the contrary, the dimension of the second electrode 32A increases continuously along the straight line perpendicular to the moving direction of the moving body 40 from the left to the right of the oscillation substrate 30. Hence, as the moving body 40 moves, the facing portion of the first electrode 41 and second electrode 31A and that of the first electrode 41 and second electrode 32A change respectively in dimensions along the straight line perpendicular to the moving direction of the moving body 40.

In this modification, the first electrode 41 always faces both the second electrode 31A and second electrode 32A regardless of the dimension of the moving body 40 along the straight line parallel to the moving direction of the moving body 40. Namely, the moving body 40 has no limitations in dimension along the straight line parallel to its moving direction. Hence, when decreasing the moving body 40 in this dimension, the moving body 40 is downsized and reduced in weight.

So far the embodiments of the present invention have been described with reference to the accompanying drawing. Note that the present invention is not limited to these embodiments, but various modifications and changes may be made without departing from the spirit or scope of the invention.

Additional advantages and modifications will readily occur to those skilled in the art. Thus, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of driving an inertial driving actuator, the actuator including:
    a fixing member;
    a moving element that is fixed to the fixing member and that generates a small displacement by extension and contraction;
    a driver to drive the moving element
    an oscillation substrate that is fixed to the moving element and is moved linearly reciprocally by the small displacement;
    a moving body that is movably located on the oscillation substrate;
    a first electrode formed on a surface of the moving body that faces the oscillation substrate;

a second electrode formed on a surface of the oscillation substrate that faces the moving body;
a frictional force controller to control a frictional force between the oscillation substrate and the moving body; and the method comprising:
adhering the moving body to the oscillation substrate;
moving the oscillation substrate in a first direction, so as to move the moving body while being adhered to the oscillation substrate in the first direction with respect to the fixing member;
releasing an attracting force acting between the oscillation substrate and the moving body; and
subsequent to the releasing, moving the oscillation substrate in a second direction opposite to the first direction while the attraction force acting between the oscillation substrate and moving body is released, so as to move the moving body by its inertia in the first direction with respect to both the oscillation substrate and the fixing member.

2. A method according to claim 1, wherein
the adhering includes applying a voltage between the first electrode and the second electrode to exert an electrostatic force between them, and
the releasing includes releasing the voltage applied between the first electrode and the second electrode.

3. A method according to claim 1, further comprising detecting a position of the moving body with respect to the oscillation substrate on the basis of an electrostatic capacitance of a facing portion of the first electrode and the second electrode.

4. A method according to claim 3, wherein the detecting a position of the moving body includes stopping application of the voltage between the first electrode and the second electrode.

5. A method according to claim 3, wherein the detecting a position of the moving body includes applying a voltage for position detection to the first electrode and stopping application of the voltage to the second electrode.

6. A method according to claim 3, wherein the second electrode includes two electrode elements, with respect to movement of the moving body in one direction, an area of a first facing portion of the first electrode and one of the two electrode elements increases continuously, and an area of a second facing portion of the first electrode and the remaining one of the two electrode elements decreases continuously on the contrary.

7. A method according to claim 6, wherein the detecting a position of the moving body includes applying comparing an electrostatic capacitance of the first facing portion and that of the second facing portion.

8. A method according to claim 6, wherein as the moving body moves, a facing portion of the two electrode elements and the first electrode changes in a dimension along a straight line parallel to a moving direction of the moving body.

9. A method according to claim 7, wherein as the moving body moves, a facing portion of the two electrode elements and the first electrode changes in a dimension along a straight line perpendicular to a moving direction of the moving body.

10. A method according to claim 2, wherein
the actuator further includes a moving element to extend and contract, the moving element being located between the fixing member and the oscillation substrate with its both ends connected to them, and
the moving the oscillation substrate in the first direction and the moving the oscillation substrate in the second direction includes causing the moving element to extend and contract.

11. A method according to claim 1, wherein the adhering and the releasing includes applying voltages having opposite polarities to one of the first electrode and the second electrode, respectively.

* * * * *